United States Patent
Liu et al.

(10) Patent No.: US 11,372,209 B2
(45) Date of Patent: Jun. 28, 2022

(54) IMAGING LENS AND ELECTRONIC DEVICE INCLUDING SIX LENSES OF +−+++− REFRACTIVE POWERS

(71) Applicant: JIANGXI LIANYI OPTICS CO., LTD., Nanchang (CN)

(72) Inventors: Xuming Liu, Nanchang (CN); Haojie Zeng, Nanchang (CN); Tian Zhang, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 0 days.

(21) Appl. No.: 16/322,106

(22) PCT Filed: Nov. 14, 2018

(86) PCT No.: PCT/CN2018/115313
§ 371 (c)(1),
(2) Date: Jan. 30, 2019

(87) PCT Pub. No.: WO2020/062476
PCT Pub. Date: Apr. 2, 2020

(65) Prior Publication Data
US 2021/0356709 A1    Nov. 18, 2021

(30) Foreign Application Priority Data
Sep. 29, 2018   (CN) .......................... 201811150780.2

(51) Int. Cl.
*G02B 13/00*   (2006.01)
*G02B 9/62*   (2006.01)
(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

2016/0170182 A1    6/2016   Tanaka
2016/0341934 A1*   11/2016  Mercado .............. H04N 5/2252
(Continued)

FOREIGN PATENT DOCUMENTS

| CN | 103576296 A | 2/2014 |
| CN | 104459951 A | 3/2015 |

(Continued)

OTHER PUBLICATIONS

First Office Action Issued in corresponding Chinese application No. 201811150780.2, dated Jul. 12, 2019 (16 pages).
(Continued)

*Primary Examiner* — Wen Huang (57) ABSTRACT

The disclosure provides an imaging lens. The imaging lens includes a first lens, a second lens, a third lens, a fourth lens, a fifth lens and a sixth lens. The first lens with positive refractive power includes a convex object side surface and a concave image side surface. The second lens with negative refractive power includes a convex object side surface and a concave image side surface. The third lens with positive refractive power includes a convex object side surface and a convex image side surface in a paraxial region of the third lens. The fourth lens with a positive refractive power includes a concave object side surface and a convex image side surface. The fifth lens has positive refractive power. The sixth lens with negative refractive power includes a concave object side surface and a concave image side surface in a paraxial region of the sixth lens.

1 Claim, 8 Drawing Sheets

(56) References Cited

U.S. PATENT DOCUMENTS

| | | |
|---|---|---|
| 2017/0184827 A1 | 6/2017 | Wu |
| 2018/0113282 A1* | 4/2018 | Tsai |
| 2019/0265438 A1* | 8/2019 | Sekine .................... G02B 9/62 |
| 2020/0057249 A1* | 2/2020 | Zhang ................ G02B 27/0025 |
| 2020/0241246 A1* | 7/2020 | Zhang .................... G02B 9/62 |

FOREIGN PATENT DOCUMENTS

| | | |
|---|---|---|
| CN | 204595308 U | 8/2015 |
| CN | 204666935 U | 9/2015 |
| CN | 205091499 U | 3/2016 |
| CN | 105572839 A | 5/2016 |
| CN | 107065136 A | 8/2017 |
| CN | 107976771 A | 5/2018 |
| CN | 108319003 A | 7/2018 |
| CN | 105911674 B | 8/2018 |
| JP | 2000019393 A | 1/2000 |
| JP | 2015084066 A | 4/2015 |

OTHER PUBLICATIONS

Notification to Grant Patent Right for invention in corresponding Chinese application No. 201811150780.2, dated Sep. 6, 2019 (7 pages).
International Search Report issued in corresponding International application No. PCT/CN2018/115313 dated Jun. 27, 2019 (7 pages).
Written opinion of the International Search Report in corresponding International application No. PCT/CN2018/115313, dated Jun. 27, 2019 (6 pages).

\* cited by examiner

IMAGING LENS AND ELECTRONIC DEVICE INCLUDING SIX LENSES OF +−+++− REFRACTIVE POWERS

CROSS-REFERENCE TO RELATED APPLICATION

This application claims priority to a Chinese application No. 2018111507802 filed on Sep. 29, 2018, titled "MICRO CAMERA LENS". The entirety of the above-mentioned application is hereby incorporated by reference herein.

TECHNICAL FIELD

The present disclosure relates to a technical field of optical lenses, and particularly to an imaging lens and an electronic device.

BACKGROUND

At present, imaging lenses have become a standard accessory of electronic devices (such as mobile phones and cameras), and imaging lenses have even become a primary indicator when consumers buy electronic devices. In recent years, with the development of design level and manufacturing technology, the imaging lenses become smaller, lighter, and have higher performance.

However, the imaging lens disposed on a portable electronic device usually has a relatively large aperture value (F number). Although the imaging lens is miniaturized, the imaging quality of the imaging lens cannot be ensured in the case of insufficient light.

SUMMARY

In view of the above problems, the present disclosure provides an imaging lens which has the advantages of miniaturization, large aperture, and high imaging quality.

The embodiment of the disclosure provides an imaging lens. The imaging lens has an optical axis, in order along the optical axis from an object side to an image side, the imaging lens may include a first lens, a second lens, a third lens, a fourth lens, a fifth lens and a sixth lens. The first lens with positive refractive power includes a convex object side surface and a concave image side surface. The second lens with negative refractive power includes a convex object side surface and a concave image side surface. The third lens with positive refractive power includes a convex object side surface and a convex image side surface in a paraxial region of the third lens. The fourth lens with a positive refractive power includes a concave object side surface and a convex image side surface. The fifth lens has positive refractive power. The sixth lens with negative refractive power includes a concave object side surface and a concave image side surface in a paraxial region of the sixth lens.

Further, the fifth lens may satisfy the following condition: $0.7<CT_{5-i}/CT_5<1.2$. Wherein, $CT_{5-i}$ is a thickness in a normal direction at any position of the fifth lens, and $CT_5$ is a center thickness of the fifth lens.

Further, the fourth lens may satisfy the following condition: $CT_{4min}>0.28$ mm. Wherein, $CT_{4min}$ is a minimum thickness of the fourth lens.

Further, the imaging lens may satisfy the following condition: $12<(f_3/f+f_4/f+f_5/f)<18$. Wherein, $f_3$ is a focal length of the third lens, $f_4$ is a focal length of the fourth lens, $f_5$ is a focal length of the fifth lens, and f is a focal length of the imaging lens.

Further, the imaging lens may satisfy the following condition: $(D_{r13r16}-D_{r13r16-50\%})/DMVA_{13}<0.015$. Wherein, $D_{r13r16}$ is a distance from the image side of the sixth lens to an imaging surface on the optical axis, and $D_{r13r16-50\%}$ is a distance from a 50% a vector height of the image side of the sixth lens to the imaging surface, and the $DMVA_{13}$ is an effective aperture of the image side of the sixth lens.

Further, the imaging lens may satisfy the following condition: $0<R_1/f<1$. Wherein, $R_1$ is a radius of curvature of the object side surface of the first lens, and f is a focal length of the imaging lens.

Further, the imaging lens may satisfy the following condition: $-3.0<R_5/R_6<0$. Wherein, $R_5$ is a paraxial radius of curvature of the object side surface of the third lens, and $R_6$ is a paraxial radius of curvature of the image side surface of the third lens.

Further, the imaging lens may satisfy the following condition: $0<(R_3-R_4)/(R_3+R_4)<0.5$. Wherein, $R_3$ is a radius of curvature of the object side surface of the second lens, and $R_4$ is a radius of curvature of the image side surface of the second lens.

Further, the imaging lens may satisfy the following condition: $TTL/f<1.2$. Wherein, TTL is a total length of the imaging lens, and f is a focal length of the imaging lens.

Further, the first lens, the second lens, the third lens, the fourth lens, the fifth lens, and the sixth lens may be all aspheric lenses.

Further, the lens may further include an aperture stop disposed on the object side of the first lens and a filter disposed between the sixth lens and an imaging surface of the imaging lens.

The imaging lens provided by the embodiments of the disclosure can effectively reduce the total size of the imaging lens by combining lenses with different shapes and refractive powers. In addition to miniaturization, the imaging lens also has a large aperture value and a high imaging quality. The imaging lens also has good applicability to the portable electronic devices, and can effectively improve the user experience.

These and other aspects of the disclosure will be more straightforward in the description of the following embodiments.

BRIEF DESCRIPTION OF THE DRAWINGS

In order to clearly illustrate the technical solutions in the embodiments of the present disclosure, the drawings used in the description of the embodiments will be briefly described below. It is obvious that the drawings in the following description are only some embodiments of the present disclosure. Other drawings can also be obtained from those skilled in the art based on these drawings without paying any creative effort.

LIST OF REFERENCE SIGNS

S0—aperture stop, L1—first lens, L2—second lens, L3—third lens, L4—forth lens, L5—fifth lens, L6—sixth lens, G—filter, P—imaging surface, 100—imaging lens.

DETAILED DESCRIPTION OF PREFERRED EMBODIMENTS

The embodiments of the present disclosure are described in detail below, and the examples of the embodiments are illustrated in the drawings, wherein the same or similar reference signs indicate the same or similar elements or elements having the same or similar functions. The embodiments described below with reference to the drawings are intended to be illustrative of the disclosure and are not to be construed as limiting.

With the popularity of portable electronic devices (such as mobile phones and imaging lenses) and the popularity of instant messaging applications, video and live show applications, people are more and more interested in taking pictures. Imaging lenses have become a standard accessory for electronic devices. Imaging lenses have even become a primary indicator when consumers buy electronic devices. In recent years, with the development of design level and manufacturing processing technology, the imaging lenses become smaller, lighter, and have higher performance.

However, on the one hand, the size of a chip used in the imaging lens will be increased if the requirement for imaging quality is increased, and the volume of the imaging lens will also be increased. It makes it difficult for the imaging lens to be miniaturized while ensuring high imaging quality.

On the other hand, electronic devices are often used for shooting portraits or close-ups, which also places higher demands on the sharpness of the imaging lens. As we all know, the larger the aperture of the imaging lens, the more light can enter, and a shutter speed can be increased. At the same time, the background blur effect and the imaging quality in the dark environment can be better. However, the imaging lens disposed on portable electronic devices usually has an F number of 2.0 or more. Although such an imaging lens can meet the demand for miniaturization, it cannot guarantee the imaging quality of the imaging lens in the case of insufficient light.

In order to solve the problems mentioned above, the embodiments of the present disclosure provide an imaging lens, which has the advantages of miniaturization, large aperture, and high imaging quality.

The technical solutions in the embodiments of the present disclosure will be clearly and completely described below in conjunction with the accompanying drawings in the embodiments of the present disclosure. It is apparent that the described embodiments are only a part of the embodiments of the disclosure, and not all of them. All other embodiments obtained by a person skilled in the art based on the embodiments of the present disclosure without creative efforts are within the scope of the present disclosure.

The First Embodiment

Figure 1:
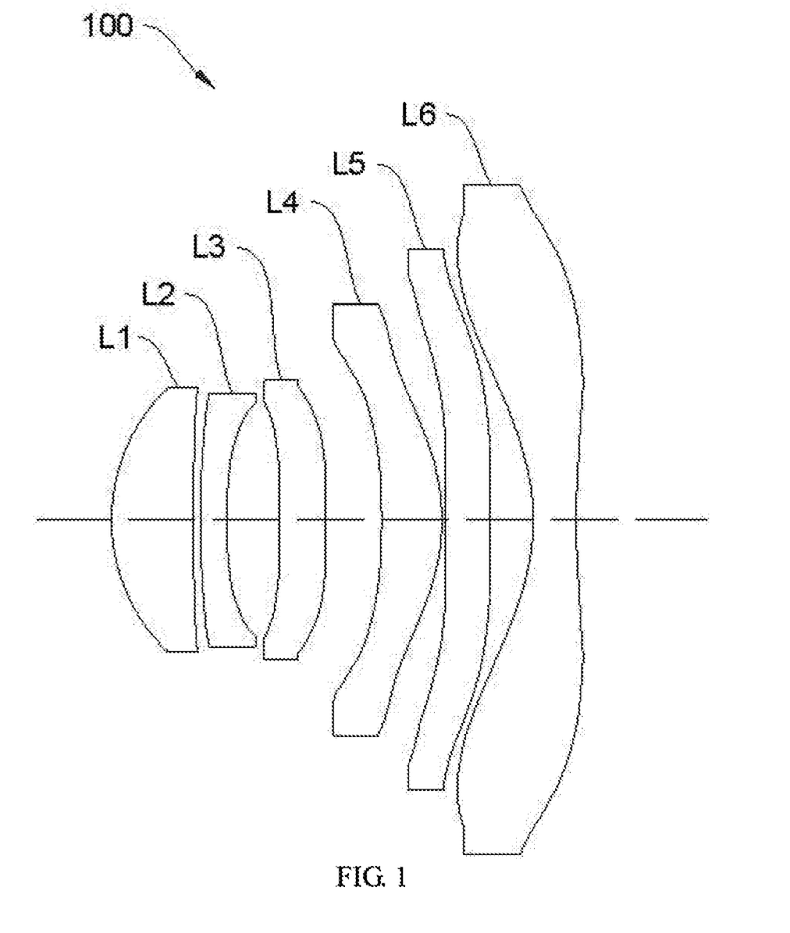
FIG. 1 is a schematic structural view of an imaging lens according to a first embodiment of the present disclosure.

FIG. 1 illustrates a schematic structural view of an imaging lens 100 according to a first embodiment of the present disclosure.

In this embodiment, as illustrated in FIG. 1, the imaging lens 100 has an optical axis, and in order along the optical axis from an object side to an image side, the imaging lens may include a first lens L1, a second lens L2, a third lens L3, a fourth lens L4, a fifth lens L5, and a sixth lens L6.

Wherein, the first lens L1 with positive refractive power may include a convex object side surface and a concave image side surface. The second lens L2 with negative refractive power may include a convex object side surface and a concave image side surface. The third lens L3 with positive refractive power may include a convex object side surface and a convex image side surface in a paraxial region of the third lens. The fourth lens L4 with a positive refractive power may include a concave object side surface and a convex image side surface. The fifth lens L5 has positive refractive power. The sixth lens L6 with negative refractive power may include a concave object side surface and a concave image side surface in a paraxial region of the sixth lens.

Figure 2:
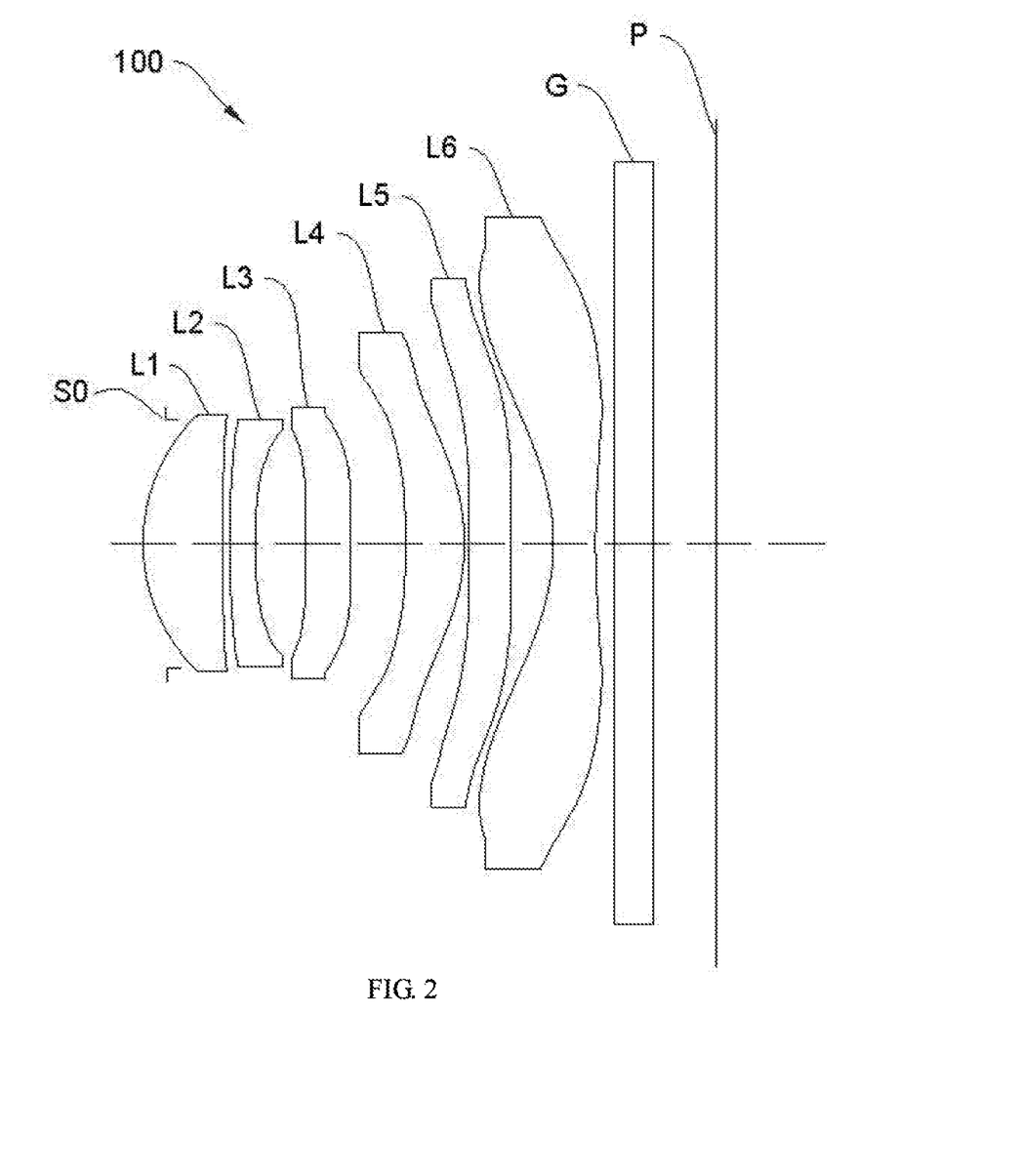
FIG. 2 is another schematic structural view of the imaging lens according to the first embodiment of the present disclosure.

As shown in FIG. 2, in the embodiment, the imaging lens 100 may further include an aperture stop S0 disposed on the object side of the first lens L1. The imaging lens 100 may also include a filter G disposed between the sixth lens L6 and an imaging surface P of the imaging lens 100. The filter G can be configured to selectively filter alight to optimize an imaging effect.

In the present embodiment, the imaging surface P may be a plane imaging surface. A light incident from the object side, clearly imaged on the plane imaging surface of the image side through the imaging lens 100. In alternative embodiments, the imaging lens 100 may further include an optical component at the position of the imaging surface P, and the optical component may be configured to image. In the embodiments, the optical component may be a photoelectric sensor.

Further, in some embodiments, the fifth lens L5 may satisfy the following condition:

$$0.7 < CT_{5\text{-}i}/CT_5 < 1.2.$$

Wherein, $CT_{5\text{-}i}$ is a thickness in a normal direction at any position of the fifth lens. If the fifth lens is an aspheric lens, a perpendicular of a tangent at any position of a curve is the normal to the position. $CT_5$ is a center thickness of the fifth lens L5. The value of $CT_{5\text{-}i}/CT_5$ greater than 0.7 is beneficial to the forming of the fifth lens L5, for off-axis rays, high-order aberrations are not easy to occur, and the performance of the fifth lens is stable. The value of $CT_{5-i}/CT_5$ is less than 1.2, which reduces the difficulty of correcting the field curvature and coma.

Further, in some embodiments, the fourth lens L4 may satisfy the following condition:

$$CT_{4min}>0.28 \text{ mm}.$$

Wherein, $CT_{4min}$ is a minimum thickness of the fourth lens L4, that is, $CT_{4min}$ is a thickness in the normal direction of the thinnest portion of the fourth lens L4. The $CT_{4min}$ larger than 0.28 mm can limit the optical thickness of the fourth lens L4 and make the fourth lens L4 easier to shape.

Further, in some embodiments, the imaging lens 100 may satisfy the following condition:

$$12<(f_3/f+f_4/f+f_5/f)<18.$$

Wherein, $f_3$ is a focal length of the third lens L3, $f_4$ is a focal length of the fourth lens L4, $f_5$ is a focal length of the fifth lens L5, and f is a focal length of the imaging lens 100. If the value of $(f_3/f+f_4/f+f_5/f)$ is greater than 12, there is no lens having refractive power increase in the third lens L3, the fourth lens L4, and the fifth lens L5, and the decentered sensitivity may be reduced. If the value of $(f_3/f+f_4/f+f_5/f)$ is less than 18, there is no lens having refractive power reduction in the third lens L3, the fourth lens L4, and the fifth lens L5, which is more advantageous for the miniaturization of the imaging lens 100.

Further, in some embodiments, the imaging lens 100 may satisfy the following condition:

$$(D_{r13r16}-D_{r13r16-50\%})/DMVA_{13}<0.015.$$

Wherein, $D_{r13r16}$ is a distance from the image side of the sixth lens L6 to the imaging surface P on the optical axis, and $D_{r13r16-50\%}$ is a distance from a 50% a vector height of the image side of the sixth lens L6 to the imaging surface P, and $DMVA_{13}$ is an effective aperture of the image side of the sixth lens L6. In the same optical back focal length, if the value of $(D_{r13r16}-D_{r13r16-50\%})/DMVA_{13}$ satisfies the above condition, the difference between the optical back focal length and the mechanical back focal length can be effectively reduced, and a total length of the imaging lens can be reduced.

Further, in some embodiments, the imaging lens 100 may satisfy the following condition:

$$0<R_1/f<1.$$

Wherein, $R_1$ is a radius of curvature of the object side surface of the first lens L1, and f is the focal length of the imaging lens 100. The value of $R_1/f$ greater than 0 can reduce the decentered sensitivity of the first lens L1. The value of $R_1/f$ less than 1 can make the refractive power of the first lens L1 not too large, and miniaturize the imaging lens 100.

Further, in some embodiment, the imaging lens 100 satisfies the following condition:

$$-3.0<R_5/R_6<0.$$

Wherein, $R_5$ is a paraxial radius of curvature of the object side surface of the third lens L3, and $R_6$ is a paraxial radius of curvature of the image side surface of the third lens L3. When the value of $R_5/R_6$ is greater than −3.0, the refractive power of the third lens L3 is not increased, the decentered sensitivity of the third lens L3 is not increased, and peripheral performance of the third lens L3 can be ensured. The value of $R_5/R_6$ less than 0 can reduce the difficulty of correcting the field curvature of the imaging lens 100.

Further, in some embodiment, the imaging lens 100 may satisfy the following condition:

$$0<(R_3-R_4)/(R_3+R_4)<0.5.$$

Wherein, $R_3$ is a radius of curvature of the object side surface of the second lens L2, and $R_4$ is a radius of curvature of the image side surface of the second lens L2. If the value of $(R_3-R_4)/(R_3+R_4)$ is greater than 0, the field curvature and distortion of the imaging lens will not increase excessively in a negative direction, avoiding difficulty in correction. If the value of $(R_3-R_4)/(R_3+R_4)$ is less than 0.5, the field curvature and distortion of the imaging lens will not increase excessively in a positive direction, which also reduces the difficulty of correction.

Further, in some embodiment, the imaging lens 100 may satisfy the following condition:

$$TTL/f<1.2.$$

Wherein, TTL is the total length of the imaging lens 100, and f is the focal length of the imaging lens 100. This condition can limit the ratio between the total length and the focal length of the imaging lens 100, and can miniaturize the imaging lens while ensuring the long focal length.

In some embodiments, the first lens L1, the second lens L2, the third lens L3, the fourth lens L4, the fifth lens L5, and the sixth lens L6 may be all aspheric lenses, and all made of plastic. In other embodiments, some of the first lens L1, the second lens L2, the third lens L3, the fourth lens L4, the fifth lens L5, and the sixth lens L6 may be spheric lenses, and others may be aspheric lenses.

Each of the lenses in the imaging lens 100 may be the aspheric lens, and each aspheric surface of the imaging lens 100 may satisfy the following condition:

$$z = \frac{ch^2}{1+\sqrt{1-(1+k)c^2h^2}} + \sum A_{2i}h^{2i}.$$

Wherein z is a vector height between a position at a height h along the optical axis and a vertex of an aspheric surface, c is a paraxial radius of curvature of the aspheric surface, k is a conic of cone coefficient, and $A_{2i}$ is an aspherical surface coefficient of the 2ith order.

The imaging lens 100 provided by the embodiment can effectively reduce the total size of the imaging lens by combining the shape and the refractive power among the first lens L1, the second lens L2, the third lens L3, the fourth lens L4, the fifth lens L5, and the sixth lens L6. The imaging lens has a large aperture and clear imaging while miniaturizing. In some embodiments, the imaging lens including six plastic lenses is small in size, compact in structure, and has a large aperture to provide better optical imaging quality, and is suitable for various portable electronic devices.

Figure 3:
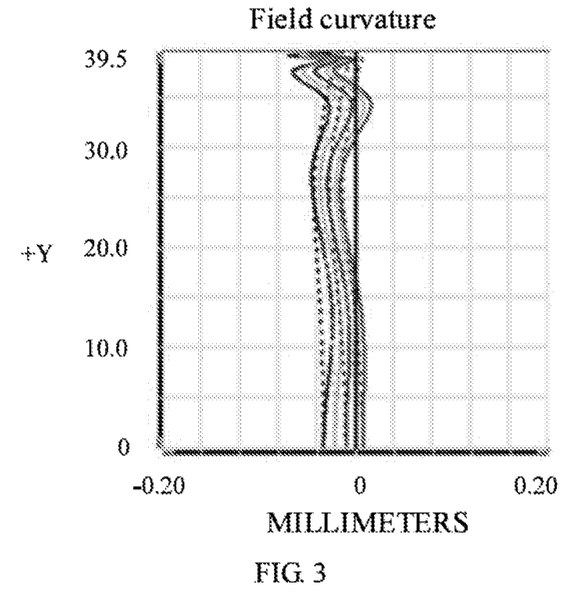
FIG. 3 is a graph showing a field curvature of the imaging lens according to the first embodiment of the present disclosure.
Figure 4:
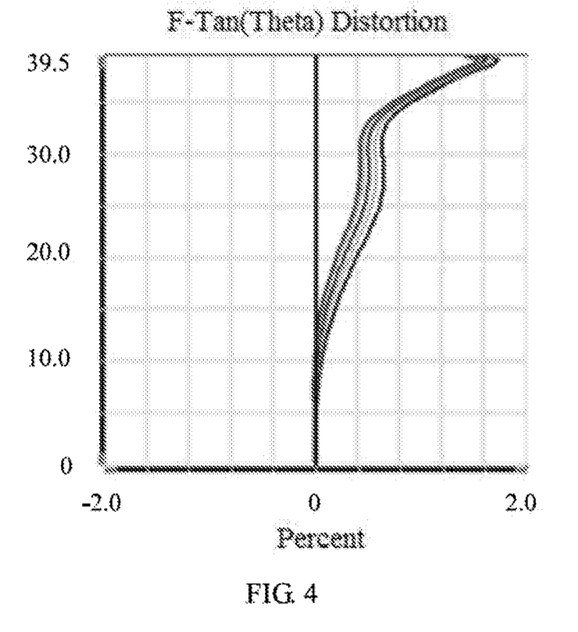
FIG. 4 is a distortion view of the imaging lens according to the first embodiment of the present disclosure.
Figure 5:
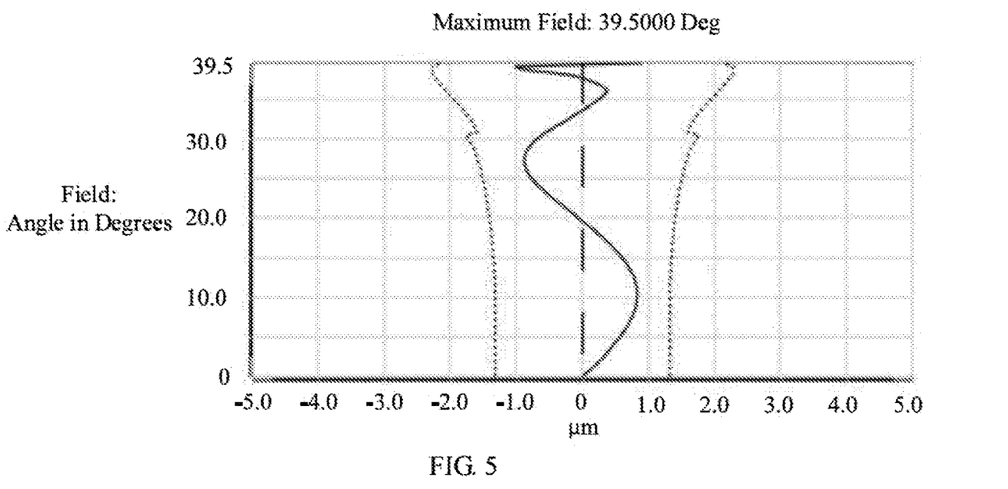
FIG. 5 is a lateral chromatic aberration view of the imaging lens according to the first embodiment of the present disclosure.

Referring to FIG. 3, FIG. 4 and FIG. 5, in the present embodiment, the field curvature curve is illustrated in FIG. 3, the distortion curve is illustrated in FIG. 4, and the lateral chromatic aberration view of the imaging lens 100 is illustrated in FIG. 5. As illustrated in the figures, field curvature, distortion and lateral chromatic aberration are well corrected.

Specifically, the design parameters of the imaging lens 100 provided by this embodiment are as shown in Table 1.

TABLE 1

| Surface No. | | Radius of curvature | Thickness | Refractive index | Abbe number |
|---|---|---|---|---|---|
| 1 | The object surface | — | 600.000 | | |
| 2 | Aperture stop S0 | — | −0.423 | | |
| 3 | The first lens | 1.413 | 0.639 | 1.544 | 55.951 |
| 4 | L1 | 4.695 | 0.064 | | |
| 5 | The second | 4.290 | 0.198 | 1.661 | 20.373 |
| 6 | lens L2 | 2.540 | 0.398 | | |
| 7 | The third lens | 49.930 | 0.361 | 1.544 | 55.951 |
| 8 | L3 | −18.130 | 0.434 | | |
| 9 | The forth lens | −4.228 | 0.467 | 1.544 | 55.951 |
| 10 | L4 | −1.516 | 0.025 | | |
| 11 | the fifth lens | 23.209 | 0.352 | 1.640 | 23.529 |
| 12 | L5 | −32.606 | 0.332 | | |
| 13 | The sixth lens | −1.686 | 0.335 | 1.535 | 55.664 |
| 14 | L6 | 5.380 | 0.158 | | |
| 15 | The filter G | — | 0.300 | | |
| 16 | | — | 0.503 | | |
| 17 | The imaging surface P | — | — | | |

In this embodiment, the aspheric parameters of the lenses in the imaging lens 100 are as shown in Table 2.

TABLE 2

| Surface No. | k | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|---|
| 3 | −0.281 | 1.54E−02 | 1.10E−02 | 2.12E−02 | −2.85E−02 | −2.39E−02 | 8.03E−02 | −4.35E−02 | — | — |
| 4 | −100.837 | −8.41E−02 | 1.00E−01 | 2.24E−02 | −5.07E−02 | −3.02E−02 | 2.87E−02 | −7.35E−03 | — | — |
| 5 | −79.807 | −1.91E−01 | 3.51E−01 | −1.55E−01 | 2.76E−03 | −1.09E−01 | 1.44E−01 | −4.83E−02 | — | — |
| 6 | −26.846 | 5.96E−02 | 9.19E−02 | 5.25E−02 | 5.57E−02 | −1.29E−01 | −1.56E−01 | 3.28E−01 | — | — |
| 7 | −99.986 | −1.57E−01 | 1.16E−01 | −1.51E−01 | 2.27E−01 | −1.06E−02 | −4.29E−01 | 4.14E−01 | — | — |
| 8 | 58.234 | −1.25E−01 | −4.14E−02 | −4.29E−02 | 4.36E−02 | 7.65E−02 | −1.68E−01 | 1.01E−01 | — | — |
| 9 | 4.406 | 9.41E−03 | −3.58E−02 | 7.13E−03 | −1.61E−02 | 9.90E−04 | 1.09E−02 | −3.44E−03 | −1.42E−05 | 0.00E+00 |
| 10 | −2.943 | −2.67E−02 | 3.88E−02 | −4.67E−03 | −1.06E−03 | −9.49E−04 | 5.88E−04 | −9.43E−05 | 2.27E−07 | 0.00E+00 |
| 11 | 99.697 | −7.24E−02 | 1.26E−02 | −6.62E−04 | 3.59E−04 | 2.69E−05 | −1.97E−05 | −2.20E−06 | 8.67E−08 | 5.36E−08 |
| 12 | −59.048 | −3.43E−02 | −5.74E−04 | 8.20E−04 | 1.64E−04 | −4.71E−06 | −3.31E−06 | −1.28E−08 | −7.88E−09 | −4.49E−09 |
| 13 | −2.538 | 1.06E−02 | 1.39E−03 | 1.70E−04 | −5.87E−06 | −4.86E−06 | −6.43E−07 | 1.20E−07 | −8.49E−11 | −2.00E−10 |
| 14 | −62.280 | −3.07E−02 | 7.19E−03 | −1.72E−03 | 1.78E−04 | −1.79E−06 | −8.65E−07 | 6.81E−08 | −1.84E−11 | −2.72E−11 |

The Second Embodiment

The configuration view of the imaging lens 100 provided in this embodiment is substantially the same as the embodiment described above, and the difference is that the design parameters are different.

Figure 6:
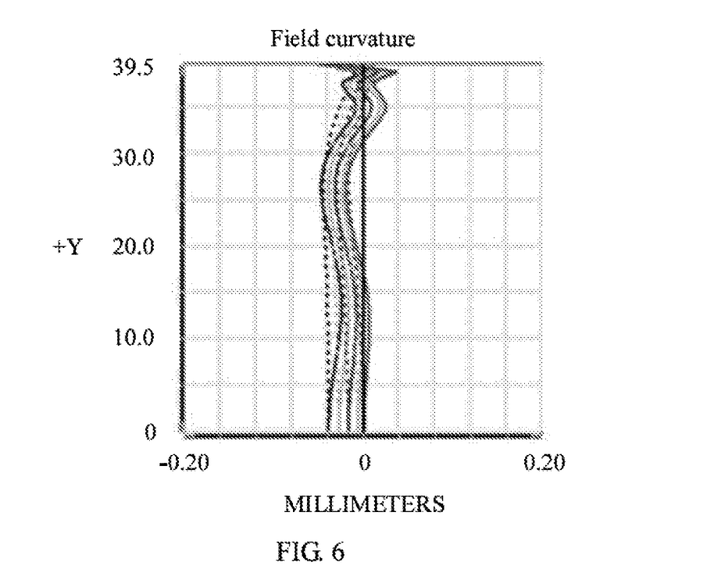
FIG. 6 is a graph showing a field curvature of the imaging lens according to a second embodiment of the present disclosure.
Figure 7:
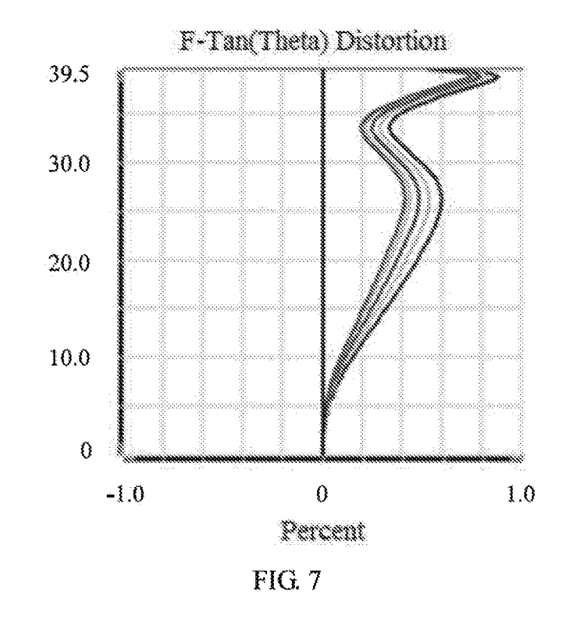
FIG. 7 is a distortion view of the imaging lens according to the second embodiment of the present disclosure.
Figure 8:
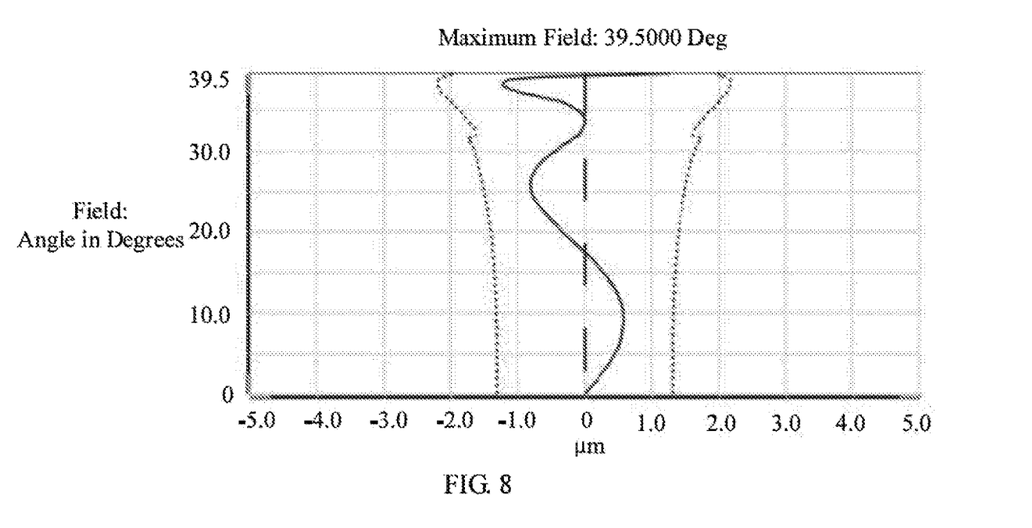
FIG. 8 is a lateral chromatic aberration view of the imaging lens according to the second embodiment of the present disclosure.

Referring to FIG. 6, FIG. 7 and FIG. 8, in the present embodiment, the field curvature curve is illustrated in FIG. 6, the distortion curve is illustrated in FIG. 7 and the lateral chromatic aberration of the imaging lens 100 is shown in FIG. 8. As illustrated in the figures, the field curvature, the distortion and the lateral chromatic aberration are well corrected.

Specifically, the design parameters of the imaging lens 100 provided by this embodiment are as shown in Table 3:

TABLE 3

| Surface No. | | Radius of curvature | thickness | Refractive index | Abbe number |
|---|---|---|---|---|---|
| 1 | The object surface | — | 600.000 | | |
| 2 | Aperture stop S0 | — | −0.450 | | |
| 3 | The first lens | 1.415 | 0.640 | 1.544 | 55.951 |
| 4 | L1 | 4.335 | 0.073 | | |
| 5 | The second | 3.611 | 0.202 | 1.661 | 20.373 |
| 6 | lens L2 | 2.238 | 0.368 | | |
| 7 | The third lens | 18.263 | 0.373 | 1.544 | 55.951 |
| 8 | L3 | −15.965 | 0.483 | | |
| 9 | The fourth lens | −4.007 | 0.436 | 1.544 | 55.951 |
| 10 | L4 | −1.538 | 0.027 | | |
| 11 | The fifth lens | 18.023 | 0.346 | 1.651 | 21523 |
| 12 | L5 | 160.259 | 0.333 | | |
| 13 | The sixth lens | −1.788 | 0.329 | 1.535 | 55.664 |
| 14 | L6 | 5.476 | 0.158 | | |
| 15 | The filter G | — | 0.300 | | |
| 16 | | — | 0.500 | | |
| 17 | The imaging surface P | — | — | | |

In this embodiment, the aspherical parameters of the lenses in the imaging lens 100 are as shown in Table 4.

TABLE 4

| Surface No. | k | A4 | A6 | A8 | A10 | A12 | A14 | A16 |
|---|---|---|---|---|---|---|---|---|
| 3 | −0.278 | 7.97E−03 | 7.14E−03 | 2.14E−02 | −2.00E−02 | −3.04E−02 | 6.80E−02 | −3.00E−02 |
| 4 | −94.013 | −6.75E−02 | 1.06E−01 | −5.63E−03 | −4.62E−02 | −6.66E−03 | 5.34E−02 | −3.76E−02 |
| 5 | −77.760 | −1.79E−01 | 3.56E−01 | −1.85E−01 | 4.36E−03 | −8.53E−02 | 1.78E−01 | −9.80E−02 |
| 6 | −27.789 | 3.21E−02 | 1.70E−01 | −1.07E−02 | −2.61E−02 | −2.82E−02 | 1.77E−02 | 9.40E−02 |
| 7 | 59.557 | −1.44E−01 | 4.52E−02 | −2.17E−01 | 2.87E−01 | 9.98E−03 | −4.21E−01 | 3.53E−01 |
| 8 | 78.000 | −1.12E−01 | −3.50E−02 | −3.80E−02 | 2.55E−02 | 8.39E−02 | −1.47E−01 | 8.05E−02 |
| 9 | 4.376 | 1.08E−02 | −1.86E−02 | 3.91E−04 | −1.51E−02 | 1.01E−04 | 1.02E−02 | −3.59E−03 |
| 10 | −2.846 | −1.73E−02 | 3.99E−02 | −7.26E−03 | −1.29E−03 | −8.14E−04 | 6.18E−04 | −7.70E−05 |
| 11 | 99.994 | −6.84E−02 | 6.02E−03 | 9.71E−05 | 4.77E−04 | 3.06E−05 | −2.01E−05 | −1.40E−06 |
| 12 | −29.550 | −4.67E−02 | 5.10E−05 | 7.39E−04 | 1.79E−04 | 7.12E−06 | −1.05E−06 | 2.04E−08 |
| 13 | −2.568 | 1.93E−02 | 2.79E−03 | 1.45E−04 | −4.09E−05 | −1.03E−05 | −8.52E−07 | 2.12E−07 |
| 14 | −61.262 | −3.61E−02 | 9.48E−03 | −1.95E−03 | 1.61E−04 | −2.02E−06 | −6.41E−07 | 1.32E−07 |

| Surface No. | A18 | A20 | $A_{22}$ | $A_{24}$ |
|---|---|---|---|---|
| 3 | — | — | — | — |
| 4 | — | — | — | — |
| 5 | — | — | — | — |
| 6 | — | — | — | — |
| 7 | — | — | — | — |
| 8 | — | — | — | — |
| 9 | 2.24E−04 | 0.00E+00 | — | — |
| 10 | −5.91E−06 | 0.00E+00 | — | — |
| 11 | 2.78E−07 | 1.45E−07 | −1.07E−08 | −9.89E−09 |
| 12 | −5.88E−08 | −2.15E−08 | −1.25E−09 | 2.10E−10 |
| 13 | 2.23E−08 | 1.45E−09 | 1.00E−10 | −9.86E−11 |
| 14 | 5.46E−09 | −3.43E−10 | −7.29E−12 | −2.35E−11 |

The Third Embodiment

The configuration view of the imaging lens 100 provided in this embodiment is substantially the same as the embodiment described above, and the difference is that the design parameters are different.

Figure 9:
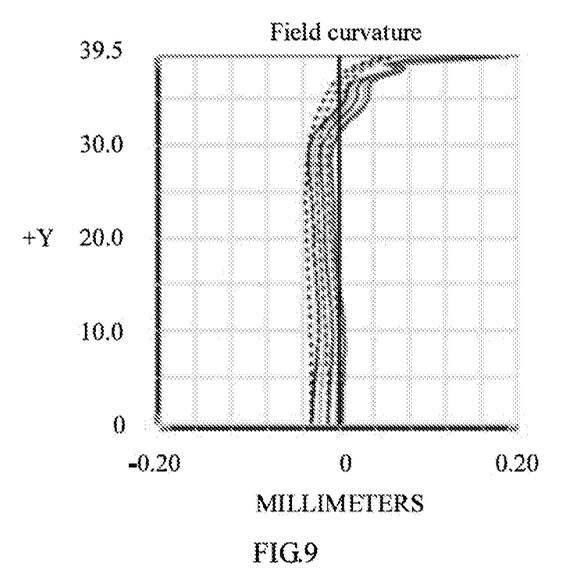
FIG. 9 is a graph showing a field curvature of the imaging lens according to a third embodiment of the present disclosure.
Figure 10:
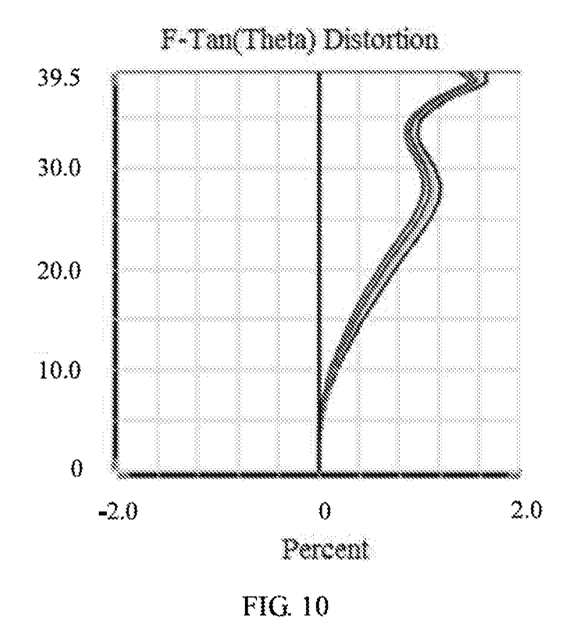
FIG. 10 is a distortion view of the imaging lens according to the third embodiment of the present disclosure.
Figure 11:
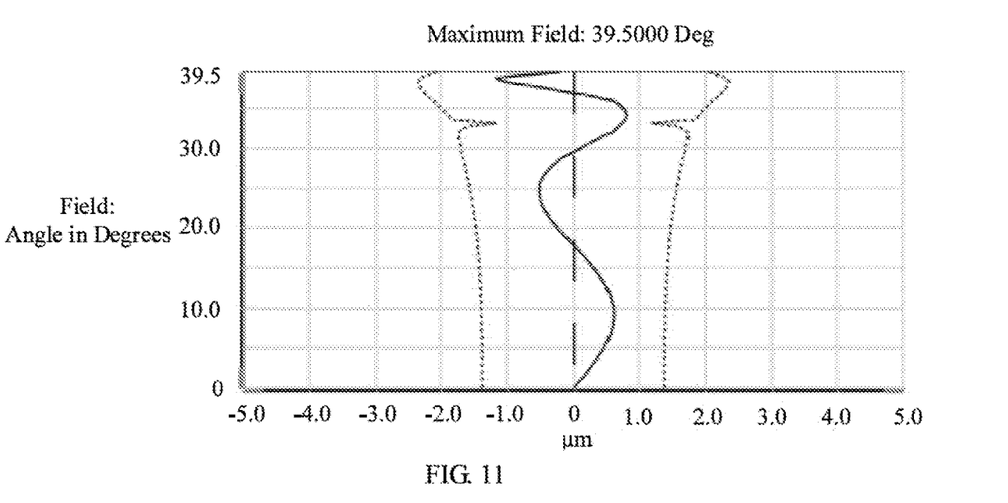
FIG. 11 is a lateral chromatic aberration view of the imaging lens according to the third embodiment of the present disclosure.

Referring to FIG. 9, FIG. 10 and FIG. 11, in the present embodiment, the field curvature curve is illustrated in FIG. 9, the distortion curve is illustrated in FIG. 10, and the lateral chromatic aberration of the imaging lens 100 is illustrated in FIG. 11. As illustrated in the figures, field curvature, distortion and lateral chromatic aberration are well corrected.

Specifically, the design parameters of the imaging lens 100 provided in this embodiment are as shown in Table 5.

TABLE 5

| Surface No. | | Radius of curvature | Thickness | Refractive index | Abbe number |
|---|---|---|---|---|---|
| 1 | The object surface | — | 600.000 | | |
| 2 | Aperture stop S0 | — | −0.376 | | |
| 3 | The first lens | 1.422 | 0.614 | 1.544 | 55.951 |
| 4 | L1 | 4.574 | 0.075 | | |
| 5 | The second | 3.013 | 0.207 | 1.661 | 20.373 |
| 6 | lens L2 | 1.925 | 0.319 | | |
| 7 | The third lens | 9.713 | 0.429 | 1.544 | 55.951 |
| 8 | L3 | −13.077 | 0.477 | | |
| 9 | The fourth lens | −3.157 | 0.468 | 1.544 | 55.951 |
| 10 | L4 | −1.371 | 0.070 | | |
| 11 | The fifth lens | −21.959 | 0.392 | 1.661 | 20.373 |
| 12 | L5 | −10.599 | 0.190 | | |
| 13 | The sixth lens | −1.921 | 0.348 | 1.535 | 55.664 |
| 14 | L6 | 3.507 | 0.158 | | |
| 15 | The filter G | — | 0.300 | | |
| 16 | | — | 0.518 | | |
| 17 | The imaging surface P | — | — | | |

In this embodiment, the aspheric parameters of the lenses in the imaging lens 100 are as shown in Table 6.

TABLE 6

| Surface No. | k | $A_4$ | $A_6$ | $A_8$ | $A_{10}$ | $A_{12}$ | $A_{14}$ | $A_{16}$ |
|---|---|---|---|---|---|---|---|---|
| 3 | −0.383 | 2.13E−02 | 1.08E−03 | 3.36E−02 | −1.83E−02 | −3.55E−02 | 8.05E−02 | −3.85E−02 |
| 4 | −146.000 | −4.34E−02 | 9.60E−02 | 6.08E−03 | −2.66E−02 | −4.02E−02 | 2.62E−02 | 2.68E−02 |
| 5 | −51.581 | −1.52E−01 | 3.35E−01 | −1.89E−01 | 1.23E−02 | −7.08E−02 | 1.20E−01 | −8.34E−02 |
| 6 | −13.905 | 4.38E−02 | 1.33E−01 | 4.93E−02 | 2.97E−03 | −1.74E−01 | −1.34E−01 | 5.72E−01 |
| 7 | 89.187 | −1.09E−01 | 4.55E−02 | −1.65E−01 | 2.75E−01 | −4.58E−02 | −3.59E−01 | 4.41E−01 |
| 8 | −99.970 | −7.89E−02 | −1.85E−02 | −5.11E−02 | 3.83E−02 | 7.20E−02 | −1.37E−01 | 9.30E−02 |
| 9 | 1.552 | 5.10E−03 | −1.19E−02 | −8.38E−03 | −1.19E−02 | −2.03E−03 | 7.42E−03 | −3.58E−03 |
| 10 | −3.621 | −5.17E−02 | 6.11E−02 | −5.93E−03 | −4.02E−03 | −1.48E−03 | 6.10E−04 | 7.76E−05 |
| 11 | 99.932 | −7.88E−02 | 7.32E−03 | −2.98E−04 | 5.62E−04 | 5.89E−05 | −9.65E−06 | 2.56E−06 |
| 12 | 24.973 | −4.44E−02 | 9.91E−04 | 4.01E−04 | 1.36E−04 | 6.29E−06 | 2.27E−07 | 1.59E−06 |

TABLE 6-continued

| | | | | | | | |
|---|---|---|---|---|---|---|---|
| 13 | −2.026 | 1.02E−02 | 2.69E−03 | 2.44E−04 | −2.31E−05 | −9.85E−06 | −1.46E−06 | −7.29E−08 |
| 14 | −35.321 | −3.74E−02 | 9.77E−03 | −2.01E−03 | 1.60E−04 | −6.78E−07 | −4.90E−07 | 3.76E−08 |

| Surface No | $A_{18}$ | $A_{20}$ | $A_{22}$ | $A_{24}$ | $A_{26}$ |
|---|---|---|---|---|---|
| 3 | −2.73E−03 | 2.63E−03 | 4.39E−03 | 2.85E−03 | −3.76E−03 |
| 4 | −6.50E−04 | −7.86E−03 | −5.68E−03 | −3.95E−03 | −1.41E−02 |
| 5 | 9.74E−03 | 6.48E−03 | 6.21E−03 | −5.68E−04 | −3.68E−02 |
| 6 | −2.23E−02 | −1.77E−01 | −2.80E−01 | −3.53E−01 | 5.58E−01 |
| 7 | −7.13E−02 | −4.93E−02 | −1.24E−02 | 7.71E−03 | −1.70E−02 |
| 8 | −1.28E−02 | −3.72E−03 | 2.74E−04 | 3.07E−03 | 6.73E−05 |
| 9 | −1.62E−04 | 1.10E−04 | 5.30E−05 | 1.04E−04 | 4.25E−05 |
| 10 | 1.62E−05 | −8.32E−06 | −2.54E−06 | 7.64E−08 | −8.48E−08 |
| 11 | 1.36E−07 | −1.29E−07 | −4.33E−08 | −1.53E−08 | −1.60E−09 |
| 12 | 2.07E−07 | 2.60E−08 | −8.99E−09 | −2.03E−09 | −3.68E−10 |
| 13 | 2.84E−08 | 8.67E−09 | 1.11E−09 | 4.88E−11 | −6.29E−11 |
| 14 | 9.94E−09 | 6.88E−10 | −4.05E−12 | −1.66E−11 | −2.93E−12 |

The Fourth Embodiment

The configuration view of the imaging lens 100 provided in this embodiment is substantially the same as the embodiment described above, and the difference is that the design parameters are different.

Figure 12:
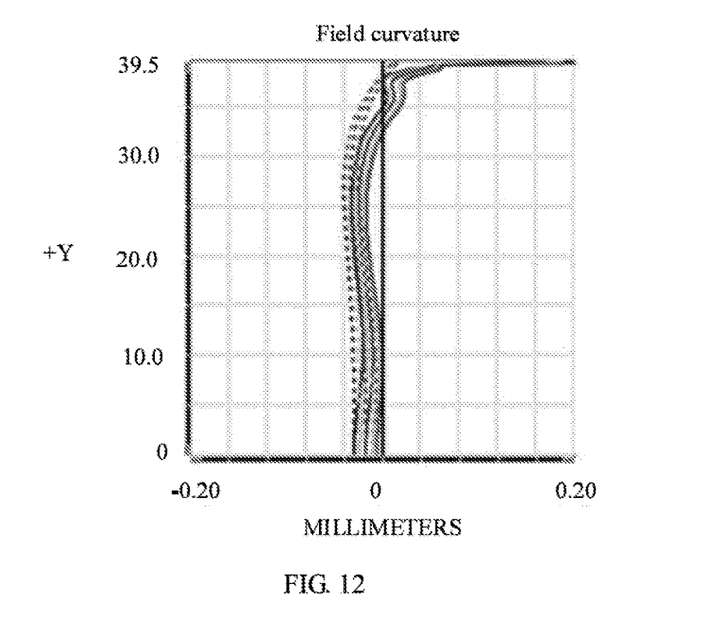
FIG. 12 is a graph showing a field curvature of the imaging lens according to a fourth embodiment of the present disclosure.
Figure 13:
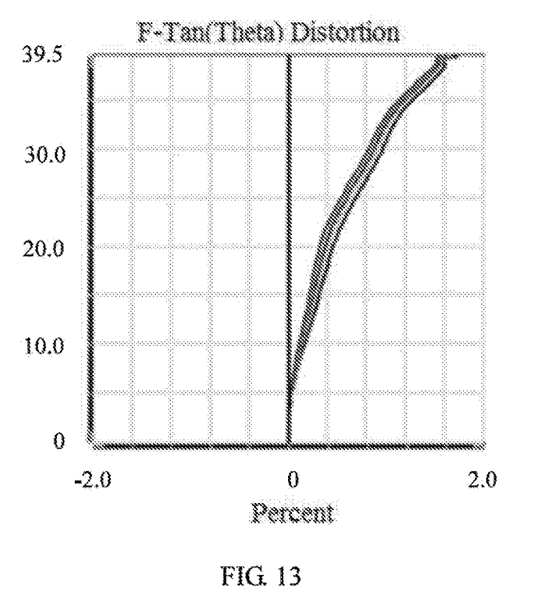
FIG. 13 is a distortion view of the imaging lens according to the fourth embodiment of the present disclosure.
Figure 14:
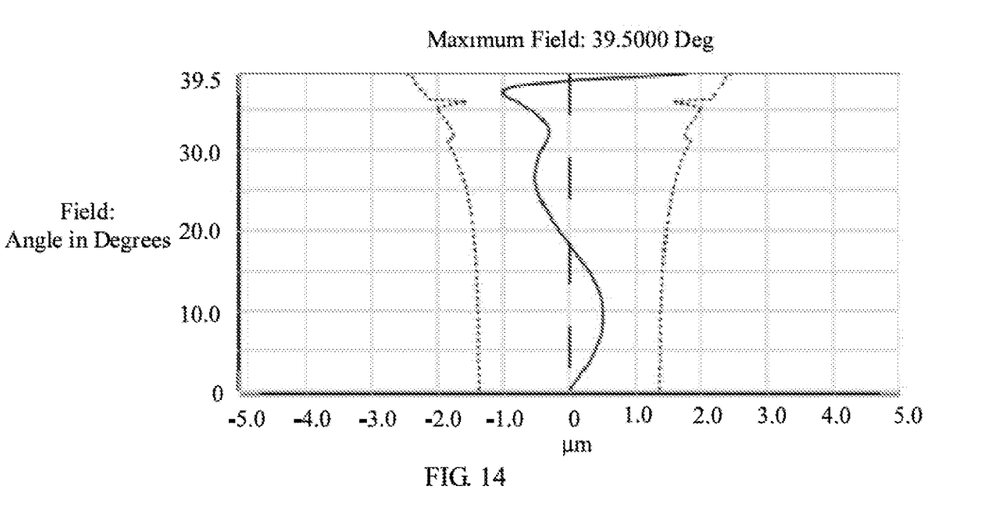
FIG. 14 is a lateral chromatic aberration view of the imaging lens according to the forth embodiment of the present disclosure.

Referring to FIG. 12, FIG. 13, and FIG. 14, in the present embodiment, the field curvature is illustrated in FIG. 12, the distortion curve is illustrated in FIG. 13, and the lateral chromatic aberration of the imaging lens 100 is shown in FIG. 14. As illustrated in the figures, field curvature, distortion and lateral chromatic aberration are well corrected.

Specifically, the design parameters of the imaging lens 100 provided by this embodiment are as shown in Table 7.

TABLE 7

| Surface No. | | Radius of curvature | Thickness | Refractive index | Abbe number |
|---|---|---|---|---|---|
| 1 | The object face | — | — | | |
| 2 | Aperture stop S0 | — | −0.368 | | |
| 3 | The first lens | 1.405 | 0.610 | 1.544 | 55.951 |
| 4 | L1 | 5.841 | 0.063 | | |
| 5 | The second lens | 3.809 | 0.209 | 1.661 | 20.373 |
| 6 | L2 | 2.084 | 0.350 | | |
| 7 | The third lens | 10.719 | 0.410 | 1.544 | 55.951 |
| 8 | L3 | −35.244 | 0.399 | | |
| 9 | The fourth lens | −3.152 | 0.477 | 1.544 | 55.951 |
| 10 | L4 | −1.309 | 0.106 | | |
| 11 | The fifth lens | −14.297 | 0.406 | 1.651 | 21.523 |
| 12 | L5 | −9.920 | 0.220 | | |
| 13 | The sixth lens | −1.983 | 0.341 | 1.535 | 55.664 |
| 14 | L6 | 3.663 | 0.158 | | |
| 15 | The filter G | — | 0.300 | | |
| 16 | | — | 0.518 | | |
| 17 | The imaging surface P | — | — | | |

In this embodiment, the aspheric parameters of the lenses in the imaging lens 100 are as shown in Table 8.

TABLE 8

| Surface No | k | $A_4$ | $A_6$ | $A_8$ | $A_{10}$ | $A_{12}$ | $A_{14}$ | $A_{16}$ |
|---|---|---|---|---|---|---|---|---|
| 3 | −0.894 | 3.99E−02 | 3.30E−02 | 2.94E−02 | −2.78E−01 | 4.18E−01 | 1.99E−01 | −4.65E−01 |
| 4 | −146.000 | −5.84E−02 | 1.26E−01 | −3.16E−02 | −4.91E−02 | −3.30E−02 | 4.86E−02 | 5.34E−02 |
| 5 | −60.826 | −1.15E−01 | 3.01E−01 | −1.66E−01 | −2.04E−02 | −6.16E−02 | 2.14E−01 | −7.46E−03 |
| 6 | −12.889 | 6.87E−02 | 1.04E−01 | 6.93E−02 | 5.53E−03 | −1.32E−01 | −1.32E−01 | 5.77E−01 |
| 7 | 62.988 | −1.20E−01 | −3.59E−02 | −1.86E−02 | 6.02E−02 | −1.17E−01 | −9.68E−02 | 7.25E−01 |
| 8 | −100.000 | −8.46E−02 | −5.31E−02 | −4.03E−02 | 8.53E−03 | 9.43E−02 | −1.47E−01 | 8.58E−02 |
| 9 | 4.866 | 1.99E−02 | 4.39E−03 | 1.19E−02 | −4.59E−02 | 6.65E−03 | 1.80E−02 | 1.75E−03 |
| 10 | −3.496 | −6.45E−02 | 7.48E−02 | 2.99E−03 | −1.13E−02 | −2.96E−04 | 1.71E−03 | −5.52E−04 |
| 11 | 32.009 | −5.93E−02 | 7.96E−03 | 4.08E−05 | 6.31E−04 | 2.61E−05 | −2.92E−05 | 4.86E−06 |
| 12 | 11.317 | −3.66E−02 | 2.96E−03 | −1.36E−04 | 1.94E−05 | 3.15E−05 | 4.69E−06 | −3.20E−07 |
| 13 | −1.324 | 1.35E−02 | 3.90E−03 | 2.54E−04 | −7.74E−05 | −2.39E−05 | −9.86E−07 | 1.22E−06 |
| 14 | −36.165 | −4.07E−02 | 1.07E−02 | −2.02E−03 | 1.45E−04 | 1.56E−06 | −4.59E−07 | 3.94E−08 |

| Surface No | $A_{18}$ | $A_{20}$ | $A_{22}$ | $A_{24}$ | $A_{26}$ |
|---|---|---|---|---|---|
| 3 | −9.72E−01 | 1.53E+00 | 4.75E−01 | −1.58E+00 | 6.31E−01 |
| 4 | 1.26E−02 | −2.97E−02 | −7.02E−02 | −6.06E−02 | 9.02E−02 |
| 5 | −9.76E−02 | −1.64E−01 | 2.37E−02 | 1.96E−01 | −8.68E−02 |
| 6 | −2.57E−02 | −1.84E−01 | −2.22E−01 | −1.82E−01 | 3.08E−01 |
| 7 | −4.59E−01 | −4.43E−01 | 5.01E−02 | 9.29E−01 | −5.40E−01 |
| 8 | 8.39E−03 | 1.00E−02 | −1.03E−02 | −2.79E−02 | 1.93E−02 |
| 9 | −1.86E−03 | −8.26E−04 | −1.16E−03 | −1.92E−04 | 5.13E−04 |
| 10 | −1.57E−04 | 1.63E−04 | −2.56E−05 | 1.24E−06 | −9.27E−07 |
| 11 | −1.27E−07 | −3.39E−07 | −1.02E−07 | −5.76E−09 | 7.30E−09 |

TABLE 8-continued

| 12 | −2.70E−07 | −4.66E−08 | −1.26E−08 | −1.37E−09 | 7.65E−10 |
| 13 | 2.26E−07 | −9.14E−08 | −7.75E−09 | 5.11E−09 | −4.62E−10 |
| 14 | 2.25E−09 | −7.58E−10 | −2.11E−10 | −3.02E−11 | 1.00E−11 |

In addition, Table 9 illustrates optical characteristics corresponding to each of the imaging lens 100 in the above four embodiments. In the Table 9, the focal length f of the imaging lens 100, the number of the apertures F #, the optical total length TTL of the imaging lens, and the value corresponding to each condition.

TABLE 9

| Condition | The first embodiment | The second embodiment | The third embodiment | The fourth embodiment |
|---|---|---|---|---|
| f (mm) | 3.894 | 3.911 | 3.897 | 3.879 |
| TTL (mm) | 4.566 | 4.569 | 4.565 | 4.568 |
| F# | 1.95 | 1.95 | 2.0 | 2.0 |
| $CT_{5-i}/CT_5$ | 0.852 | 0.867 | 0.765 | 0.738 |
| $CT_{4\,min}$ | 0.322 | 0.305 | 0.341 | 0.337 |
| $f_3/f + f_4/f + f_5/f$ | 12.734 | 13.009 | 11.456 | 17.141 |
| $(D_{r13r16} - D_{r13r16-50\%})/DMVA_{13}$ | 8.149E−3 | 7.084E−3 | 0.013 | 0.012 |
| $R_1/f$ | 0.363 | 0.362 | 0.365 | 0.362 |
| $R_5/R_6$ | −2.754 | −1.144 | −0.743 | −0.304 |
| $(R_3 - R_4)/(R_3 + R_4)$ | 0.256 | 0.235 | 0.220 | 0.293 |
| TTL/f | 1.173 | 1.168 | 1.172 | 1.178 |

In each of the above embodiments, the thickness, the radius of curvature, and the material of each lens in the imaging lens 100 are different. For specific differences refer to the parameter table in each embodiment. The above-described embodiments are merely preferred embodiments of the present disclosure, but the embodiments of the present disclosure are not limited by the above embodiments, and any other changes, substitutions, combinations, or simplifications that do not depart from the innovation of the present disclosure. It is intended that equivalent substitutions are included within the scope of the disclosure.

In summary, the imaging lens provided by the embodiment can effectively reduce the total size of the imaging lens by combining the shape and the refractive power among the lenses. The imaging lens has a large aperture and clear imaging while miniaturizing. In the embodiments, the imaging lens is small in size, compact in structure, has a large aperture to provide better imaging quality, and is suitable for various portable electronic devices, can effectively enhance the user's imaging lens experience.

Finally, it should be noted that the above embodiments are only used to illustrate the technical solutions of the present disclosure, and are not limited thereto. Although the present disclosure has been described in detail with reference to the foregoing embodiments, those of ordinary skill in the art should understand that it can still modify the technical solutions described in the foregoing embodiments, or replace some of the technical features, and the modifications and substitutions do not drive the essence of the corresponding technical solutions from the spirit and scope of the technical solutions of the embodiments of the present disclosure.

What is claimed is:

1. An imaging lens, having an optical axis, in order along the optical axis from an object side to an image side, the imaging lens comprising:
    a first lens with positive refractive power, the first lens comprising a convex object side surface and a concave image side surface;
    a second lens with negative refractive power, the second lens comprising a convex object side surface and a concave image side surface;
    a third lens with positive refractive power, the third lens comprising an object side surface and an image side surface both being convex in a paraxial region of the third lens;
    a fourth lens with a positive refractive power, the fourth lens comprising a concave object side surface and a convex image side surface;
    a fifth lens with positive refractive power; and
    a sixth lens with negative refractive power, the sixth lens comprising an object side surface and an image side surface both being concave in a paraxial region of the sixth lens;
    wherein the imaging lens satisfies the following condition:

$$0.7 < CT_{5-i}/CT_5 < 1.2,$$

where $CT_{5-i}$ is a thickness at any position of the fifth lens in a normal direction, and $CT_5$ is a center thickness of the fifth lens.

* * * * *